April 28, 1959     A. C. BLAINE     2,883,765
CHILD'S CHORES RECORDER FOR PRODUCING INCENTIVE
Filed May 16, 1955
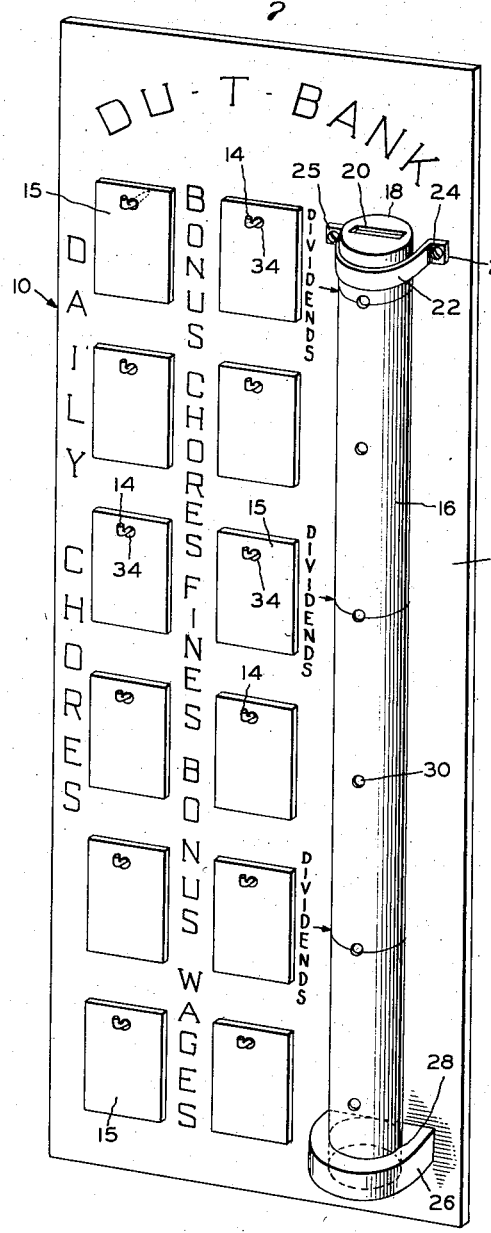
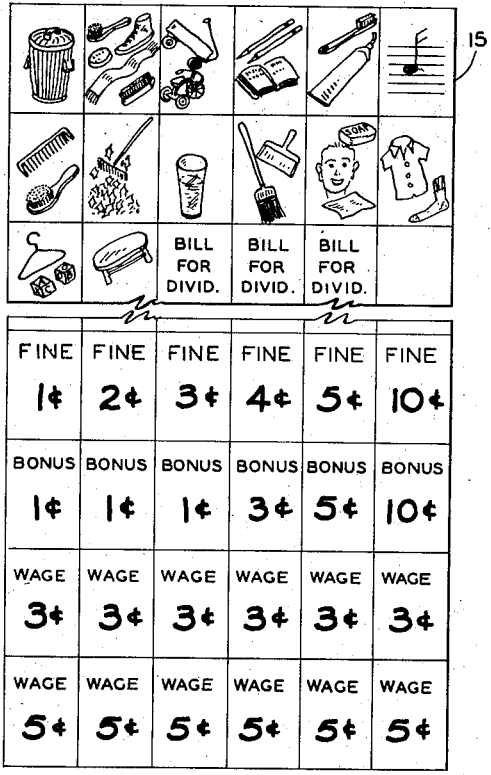
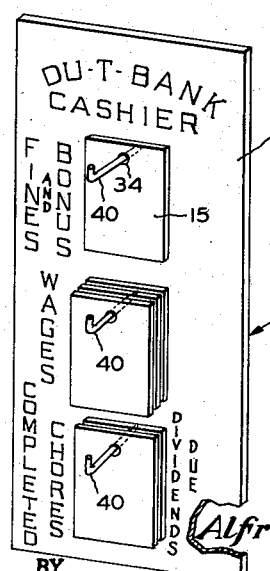
INVENTOR
Alfred C. Blaine
BY
       Gustave Miller
ATTORNEY

United States Patent Office 2,883,765
Patented Apr. 28, 1959

2,883,765

CHILD'S CHORES RECORDER FOR PRODUCING INCENTIVE

Alfred C. Blaine, St. Petersburg, Fla., assignor to Gustave Miller, Washington, D.C.

Application May 16, 1955, Serial No. 508,532

1 Claim. (Cl. 35—23)

This invention relates to a device for recording chores to be done by children and to payments for the accomplishment of such chores and fines for their non-accomplishment.

It is one object of the present invention to provide an incentive producer for children to provide them with an incentive for performing the various chores of which they are capable.

Another object of the present invention is to provide a clear, running record of the rewards or forfeitures acting as a measure of a child's cooperation in the home or schoolroom.

Another object of the present invention is to provide an incentive record for children which can be easily understood by them and which is simple to use.

Other objects of the present invention are to provide an improved device, of the character described, that is easily and economically produced, which is sturdy in construction, and which is highly efficient in operation.

With the above and related objects in view, this invention consists in the details of construction and combination of parts, as will be more fully understood from the following description, when read in conjunction with the accompanying drawing in which:

Fig. 1 is a front perspective view of one element of an assembly embodying the present invention.

Fig. 2 is a top plan view of the device of Fig. 1.

Fig. 3 is a front elevational view of a master sheet from which the indicating means, used on the element of Fig. 1 are cut.

Fig. 4 is a front perspective view of the cashier board element of the assembly.

Referring now in greater detail to the drawing wherein similar reference characters refer to similar parts, there is shown an indicator board 10 comprising a flat panel 12, of generally rectangular shape. The panel 12 may be constructed of wood, metal, plastic, or any other desirable type of material, and is provided with two longitudinal columns of hooks 14, extending out from the front surface thereof.

Each hook 14 is adapted to hold an indicator check 15 having appropriate indicia thereon. The indicia on the check will determine on which hook it is to be placed. For example, the left hand column of hooks 14 on panel 12 are used to display the daily chores selected by the parent, teacher or the like. The right hand column of hooks 14 are divided into two groups, the upper group consisting of the upper three hooks which display bonus chores consisting of chores suggested by the parent or teacher but which the child is not compelled to do, the fourth hook which displays the fines or forfeitures for not performing a required task as displayed in the left hand column, the fifth hook which displays the bonus for the suggested chores of the first three hooks of this column, and the last hook which displays the wages for the daily tasks displayed in the left hand column.

At the right of the right hand column of hooks 14 is provided an elongated cylindrical tube 16 having a top closure 18. A slot 20 is provided in top closure 18 for receiving coins of various dimensions. The top portion of the tube 16 is clamped to the panel 12 by a clamping collar 22 which is connected to the panel by screws 24 inserted through flanges 25 on the collar. The bottom portion of the tube is enclosed by a bracket 26 having a circular recess 28 in its top surface to tightly receive the bottom of the tube. A row of axially spaced holes 30 are provided in the tube 16. These holes 30 are indicating means which show the level of the stack of coins in the tube. The indicator checks 15 are cut from a master sheet 32 which is separated into various frames, each of which is provided with appropriate indicia at the time of manufacture. The master sheet may, preferably, be in the form of a sheet of decals. In use, the parent or teacher cuts out the appropriate frames which form the indicator checks. Appropriate hook-receiving holes 34 may either be pre-formed in the various frames of the master sheet or may be punched out after the checks are cut out from the sheet.

In Fig. 4, there is shown the cashier board 36. This cashier board comprises a flat panel 38, preferably constructed of the same material as the board 10. Three vertically spaced hooks 40 extend forward from the front face of the panel 38 and are adapted to receive the checks 15. The first hook 40 is adapted to hold checks corresponding to fines or bonuses, the second hook is for holding checks corresponding to wages, and the third hook is for holding checks corresponding to the daily and bonus chores.

At the beginning of the week, checks corresponding to all wages, bonus money, fines, etc., are hung on the upper two hooks of the cashier board. As the child completes his chores, whether required or bonus, he hangs the corresponding check on the bottom hook 40. When all duties are completed for the day, the child is given such wage, bonus or fine check as he has earned that day, along with all the checks corresponding to chores. All these checks are hung by the child in their appropriate places on board 10. At the end of the week, the parent or teacher redeems for cash all wage and bonus checks, less the total amount of the fines. A specified amount of this money is to be deposited in the bank, represented by tube 16, the balance to be retained by the child for his own purposes. As can be easily seen, not only does this device aid the initiative and cooperation of the child, but it also permits him to acquire the "saving habit" which will always be of such importance to him.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

An incentive producing device for inducing saving, comprising a panel having two vertically aligned rows of equidistantly spaced hooks, each hook having an elongated shank and an upturned end portion, vertically aligned rows of indicia adjacent each column of hooks, a plurality of indicator checks each bearing indicia and having an opening adjacent one edge adapted to be positioned on the shank of a hook, each shank being of a length sufficient to accommodate a plurality of checks, said vertical rows of hooks being spaced apart a sufficient distance to accommodate two rows of checks spaced apart a distance sufficient to disclose one row of vertically aligned indicia therebetween, said panel being of a width to permit the disclosure of an additional row of indicia on either side of said rows of checks and extending beyond one of said additional rows of indicia to provide a side extension, a bracket having a recess in the top surface thereof secured to said side extension adjacent the lowest point of the lowest check of said rows of checks, an elongated cylindrical tube having its lower end seated in said recess, and an open top adjacent the top point of the uppermost check of said rows of checks, a removable top closure having a coin slot therein closing said open top, a clamping collar embracing said tube adjacent said open top, screws securing the ends of said clamping collar to said side extension of said panel, said tube having a plurality of axially spaced sight holes therein corresponding in number to the number of checks in a row of checks and located in horizontal alignment with an intermediate point of an adjacent check, the indicia on said checks and said vertically aligned indicia being correlated to indicate chores completed and to be done together with payments therefor, and said sight openings being correlated with said indicia to render visible the quantity of coins deposited or to be deposited in said tube in accordance with the correlation of the indicia of said cards and said vertically aligned indicia.

References Cited in the file of this patent

UNITED STATES PATENTS

| | | |
|---|---|---|
| 1,553,433 | Butcher | Sept. 15, 1925 |
| 2,512,485 | Cougias | June 20, 1950 |

FOREIGN PATENTS

| | | |
|---|---|---|
| 66,406 | Austria | Aug. 25, 1914 |